United States Patent [19]
Green et al.

[11] Patent Number: 5,167,439
[45] Date of Patent: Dec. 1, 1992

[54] WHEEL AND BRAKE SYSTEM

[75] Inventors: Amy Green, New York; Darryl Chu, Brooklyn; Leanne Tosca, New York; Stephen Wilkonski, East Meadow; Stephen Waldron, Jamaica, all of N.Y.; Joseph Urban, Storrs, Conn.

[73] Assignee: Hexaform Design, Incorporated, Hewlett, N.Y.

[21] Appl. No.: 576,681

[22] Filed: Aug. 31, 1990

[51] Int. Cl.$^5$ .............................................. B60B 15/20
[52] U.S. Cl. ..................... 301/5.1; 301/64.7; 152/5; 305/5; 280/5.26; 188/82.3
[58] Field of Search .................. 301/1, 5 R, 63 PW; 152/1, 5, 7, 11, 12, 323, 324; 188/82.3, 82.34, 82.4, 82.7, 82.77; 280/5.2, 5.26; 414/446, 457; 305/1, 4, 5, 19

[56] References Cited

U.S. PATENT DOCUMENTS

| | | |
|---|---|---|
| 710,593 | 10/1902 | Medley . |
| 952,175 | 3/1910 | Badgley . |
| 1,254,016 | 1/1918 | Anderson . |
| 1,306,587 | 6/1919 | Ferguson . |
| 1,512,820 | 10/1924 | Critchlow ........................ 152/5 |
| 2,039,148 | 4/1936 | Dodge ........................ 188/82.4 |
| 2,633,363 | 3/1953 | Marshall ........................ 280/5.26 |
| 3,041,003 | 6/1962 | Kettler . |
| 3,275,175 | 9/1966 | Arnold ........................ 414/457 X |
| 4,125,074 | 11/1978 | Sato ........................ 188/82.7 |
| 4,142,732 | 3/1979 | Boyd ........................ 280/5.26 |
| 4,362,202 | 12/1982 | Sacks . |
| 4,560,033 | 12/1985 | De Woody et al. . |
| 4,733,730 | 3/1988 | Murray . |

FOREIGN PATENT DOCUMENTS

| | | | |
|---|---|---|---|
| 216966 | 1/1961 | Austria ........................ 414/457 |
| 57587 | 10/1890 | Fed. Rep. of Germany ... 188/82.77 |
| 359590 | 2/1919 | Fed. Rep. of Germany ......... 305/5 |
| 997556 | 1/1952 | France ........................ 414/457 |
| 150136 | 5/1955 | Sweden ........................ 280/5.26 |
| 134173 | 10/1919 | United Kingdom ........... 280/5.26 |
| 160144 | 9/1921 | United Kingdom ........... 305/5 |

Primary Examiner—Russell D. Stormer
Attorney, Agent, or Firm—Kenyon & Kenyon

[57] ABSTRACT

A wheel and brake system adapted for use with a vehicle for transportation comprising: a tread having a plurality of elements circumferentially spaced around the wheel to define a substantially circular outer edge of the tread, the elements capable of flexing inwardly upon contact with a protruding surface to expose a load bearing surface to support a load of the vehicle; a brake; and a handle connected to the brake and adapted for moving of the vehicle in a pulling direction and engaging brake when a pulling force is applied in the pulling direction, the brake when engaged, adapted to permit rotation of the wheel in the pulling direction and to impede rotation of the wheel in an opposite direction. In one embodiment, the brake system comprises two braking elements and a brake actuating element to controllably engage one braking element to impede rotation thereof, the one braking element engaging another braking element to impede rotation of the wheel.

16 Claims, 10 Drawing Sheets

WHEEL AND BRAKE SYSTEM

FIELD OF THE INVENTION

The present invention is directed to a wheel and brake system.

BACKGROUND OF THE INVENTION

While there are many types of utility carts and similar devices that facilitate the moving of items such as groceries and laundry, such devices do not provide for ease of operation over varied terrain, inclines or uneven surfaces, for example, up and down stairs, over ramps with slats or over curbs.

Some of the disadvantages of the existing devices generally include the relatively small wheel sizes which present difficulty when an operator attempts to move a device over protruding surfaces, and also the absence of an integral braking system which will prevent the device from rolling away while the device is being move An explanation for the corresponding difficulty in operating a device with smaller wheels is that a smaller wheel will contact the rising surface or the outermost edge of a protruding surface, for example a riser of a stair, before it contacts the more horizontal portion of the surface. Thus, the device must be moved over the outermost edge of the surface, which is normally on a substantially different angle than the line of force being directed on the cart by a user. This change in angle presents increasing difficulty for the user to maneuver the device.

Generally, large wheel systems have been avoided due to the tendency, for example, of a large wheel device to roll downward under its own weight when a user moves the device upstairs or over inclines and pauses before reaching the top. The existing devices do not provide braking systems to overcome the disadvantages of large wheel systems.

SUMMARY OF THE INVENTION

The present invention provides a wheel and braking system which may be applied to any device utilizing a wheel for transportation. The wheel and braking system enables a user to maneuver the device over inclines, stairs and protruding surfaces in addition to over horizontal and other surfaces with relative ease. A feature of the invention provides an integral braking system which may be used in combination with a larger wheel, permitting the advantages of the large wheel systems, i.e., ease of movement over inclines, while incorporating the elements of the braking system to overcome the disadvantages of large wheel systems. Another feature of the invention provides a tread system which contributes to the stability and maneuverability of the device.

The advantages of large wheel devices are realized to a greater degree as the wheel becomes larger. As the wheel size increases, the angle with respect to the axle of the wheel at which the protruding surface intersects the wheel decreases relative to the point on a surface where the wheel rests. Thus, the larger the wheel, the smaller the angle is between where the wheel rests and the edge of the protruding surface over which the device is to be maneuvered, and the easier it is to move the device over the protruding surface. When the device is used on stairs, the radius of the wheel is preferably greater than the height of a riser of a stair over which the device will be moved.

The braking system prevents the device from moving away from the user. The braking system is preferably one which is activated by the user from a handle which the user uses to move the device.

In one embodiment of the present invention, the system provides self-actuated braking in which the brake engages in response to the user pulling on the handle of the device and continues to be engaged while the user pulls the device. The braking function brakes the wheel in one direction to prevent the device from moving away from the user while permitting continuous unidirectional movement of the cart in the direction in which the user is pulling the device. The brake may be designed to disengage when the user pushes the device. The braking feature of the invention may also enable the user to activate a brake by applying a force to the handle of the device.

The wheel of the invention comprises a tread and a support structure further arranged to provide a mechanical, load-bearing contact between the wheel and an uneven surface such as a staircase, contributing to the stability and ease of movement of the device. In particular, the tread comprises a plurality of elements circumferentially spaced around the wheel to define a substantially circular outer edge of the tread and flexing to expose a surface arranged to bear the weight of the device.

In one embodiment of the present invention, the tread design provides for a plurality of radially projecting elements which make up the outer circumference of the wheel. The radially projecting elements provide a substantially circular outer edge for rolling on a flat surface. The radially projecting elements also provide a tread which upon contacting an edge or protruding surface such as a staircase or a ramp with surface slats, will flex radially inward, the outer edge of the tread being penetrated by the protruding surface to expose a load-bearing surface. Thus, in addition to supporting a load by a frictional contact between the wheel and the protruding surface, the tread will provide for a load bearing contact with the protruding surface. Such contact occurs where the exposed load bearing surface bypasses the outermost edge of the protruding surface and contacts the protruding surface at an angle less than parallel and preferably approaching or at perpendicular to the force of the surface acting upon the wheel, i.e., at an angle relatively more horizontal than the outermost edge of the protruding surface. As the tread accesses a more horizontal plane of the surface the better the load bearing contact will be.

In one embodiment of the invention, the radially projecting elements each comprise: a radial projection which projects from a rim portion of the tread, the rim portion extending circumferentially around a hub of the support structure of the wheel; a heel portion at the outermost extension of the radial projection; and a flexible resilient toe portion extending circumferentially from the heel portion. The toe portion is radially spaced from the rim portion of the tread. The heel portion has a back which is circumferentially spaced from an adjacent radially projecting element. Load bearing elements of the support structure extend radially outward from the hub into the radial projections and provide additional support for the radially projecting elements. Each load bearing element has two arms which are fanned out at the hub and which join as they approach the heel portion. The thickness of the radially projecting elements correspondingly increase as the radially projecting elements approach the hub. The heel portions transfer the weight of the cart to the hub via the load bearing elements.

As the wheel rotates, a protruding surface causes the flexible, resilient toe portion to flex inward thus penetrating the outer circumference of the tread, and exposing the back of the heel of an adjacent radially projecting element to the protruding surface. The exposed back of the heel acts as a load bearing surface spaced radially inwardly from a substantially circular outer edge of the tread upon which the wheel can rest on the protruding surface.

In addition to providing a combined load bearing and frictional contact with uneven surfaces such as stairs, the radially projecting elements may provide the further function of minimizing rattle and/or vibrations common for example, with rolling gears. This feature of the invention provides continuity of the radius of the wheel from radially projecting element to radially projecting element.

In one embodiment of this feature of the invention, the toe portion projects cant from the radius of the wheel with respect to the tangent of the heel portion. The toe portions thereby provide continuity of the circumference of the wheel between the heel portions. The toe portions smooth out the transfer of weight from heel to heel and tend to absorb the shock and thus reduce vibrations or rattle resulting from the heel to heel weight transfer.

An alternative configuration of the toe and heel portions of the radially projecting elements may be a bowed profile from heel to toe. This configuration also serves to smooth out the circumference of the tread between the load bearing elements, i.e., between the heel portions of the radially projecting elements. Thus, the bowed elements absorb the shock resulting from the shifting of the weight of the device from heel portion to heel portion, and thereby reduce the rattle and other vibrations.

In one embodiment, the tread comprises a flexible, resilient material such as a plastic or rubber while the support structure comprises a firm material and provides structure and support for the wheel.

Another feature of the present invention provides for a simple assembly of the wheel which permits coupling of the tread to the support structure without requiring adhesives or additional elements. The tread and the hub of the support structure are constructed so that they interconnect while the tread still provides the rotational resistance necessary for the support structure and tread to function effectively together as a wheel system with braking capabilities. In order to simplify manufacturing, one embodiment of this feature may provide for a tread and support structure, each of which is a single unit manufactured of a material having preferred characteristics.

The system of the invention may be used with a utility cart which transports items such as groceries, laundry or garbage. The system enables the transport of such items over uneven surfaces or up and down stairs with minimal effort.

In accordance with another feature of the present invention, various containment vessels may be used, the construction of each vessel depending on the particular use for which the device is to be employed. The cart and containment vessels are designed to interconnect so that a vessel may be lifted off the ground with minimal effort. In one particular embodiment, each containment vessel is profiled with grooves or indentations on the bottom of the vessel. The cart has slide in arms which are received in the grooves or indentations to connect the cart with the vessel and which are used to lift the vessel.

Moreover, the cart may be designed so that it is foldable for convenient storage or transport when not in use.

DETAILED DESCRIPTION

Figure 1A:
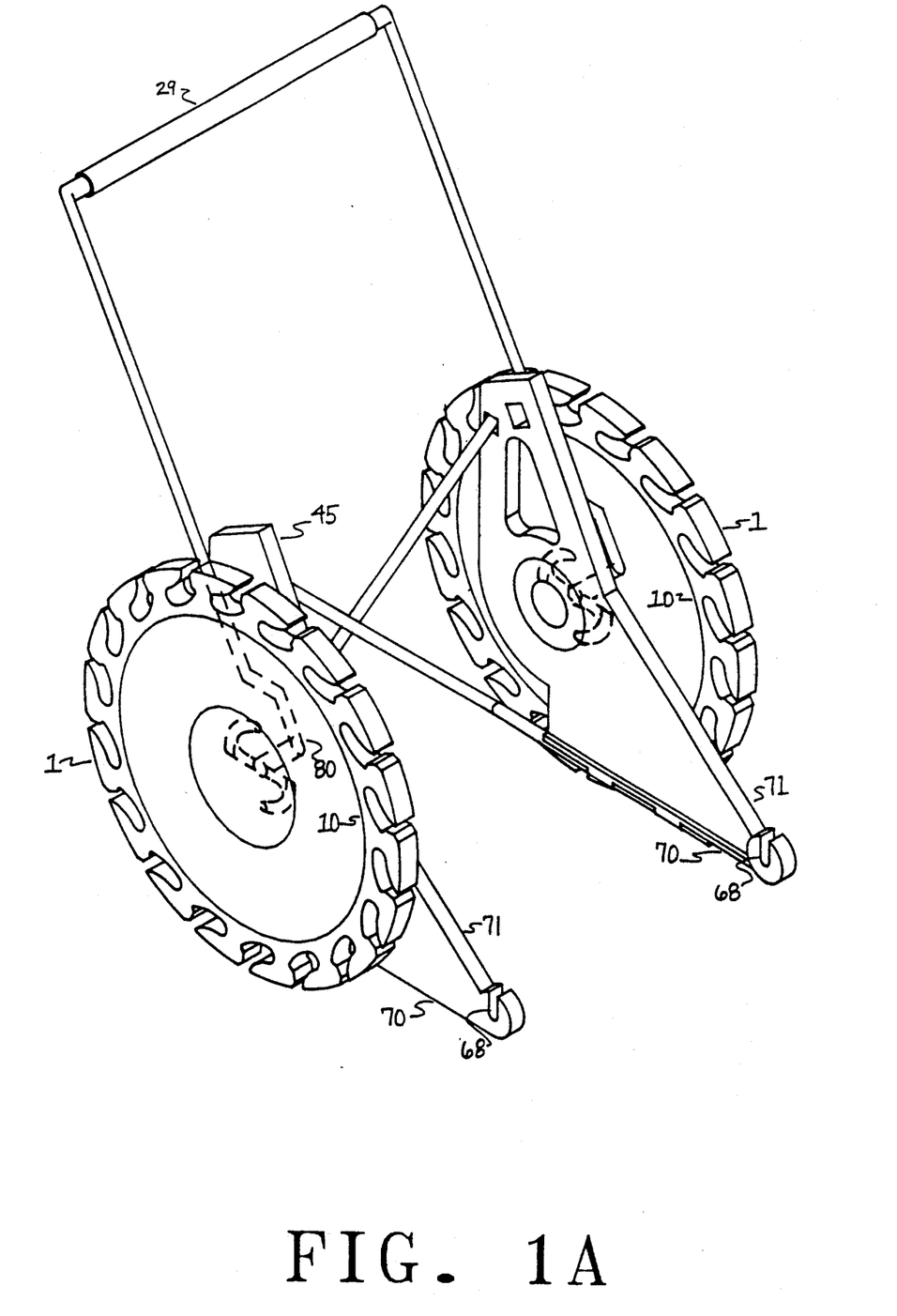
FIGS. 1A-D illustrate the wheel and brake system of the present invention used in conjunction with a cart having various optional containment vessels.
Figure 1B:
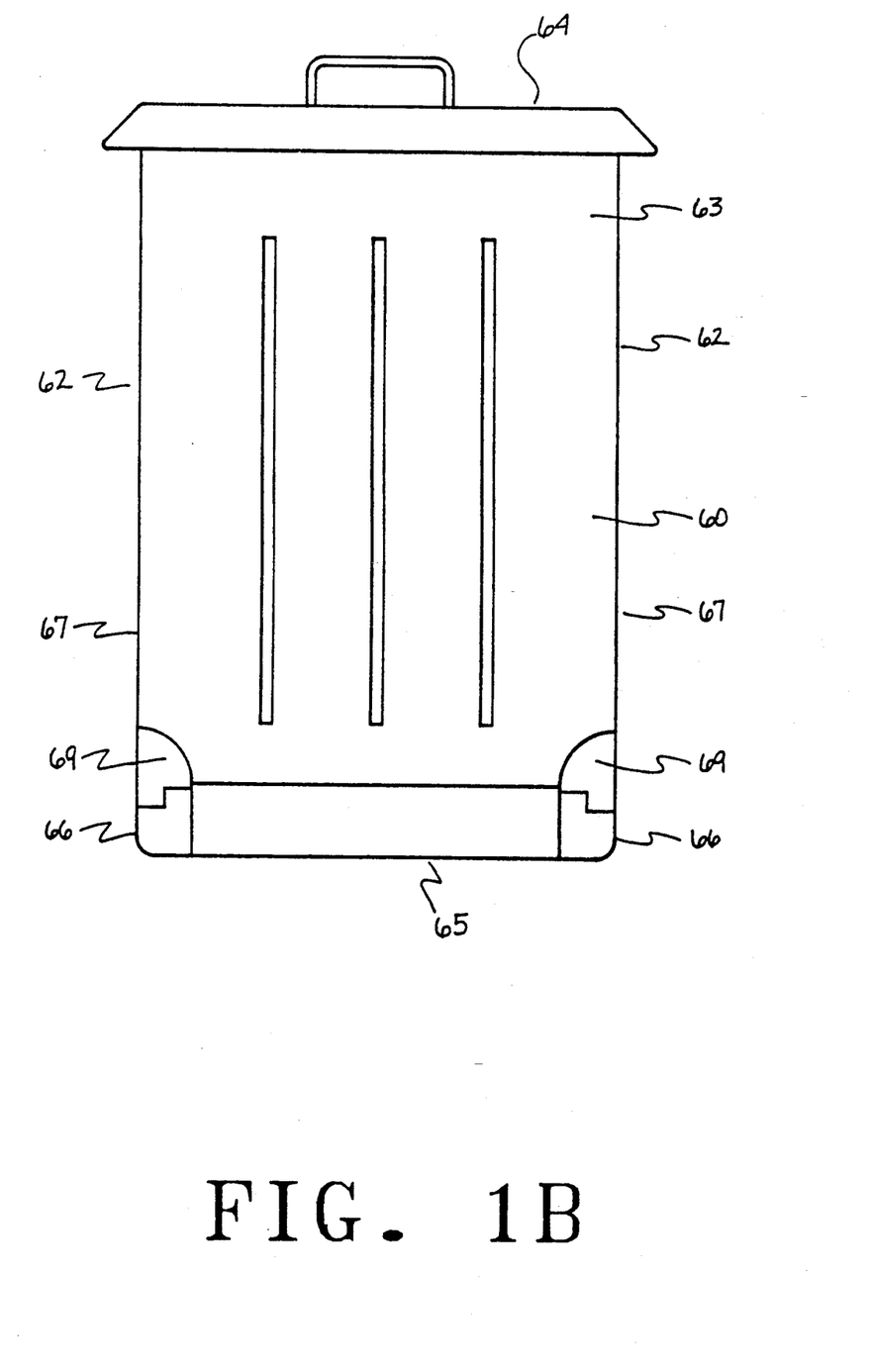
Figure 1C:
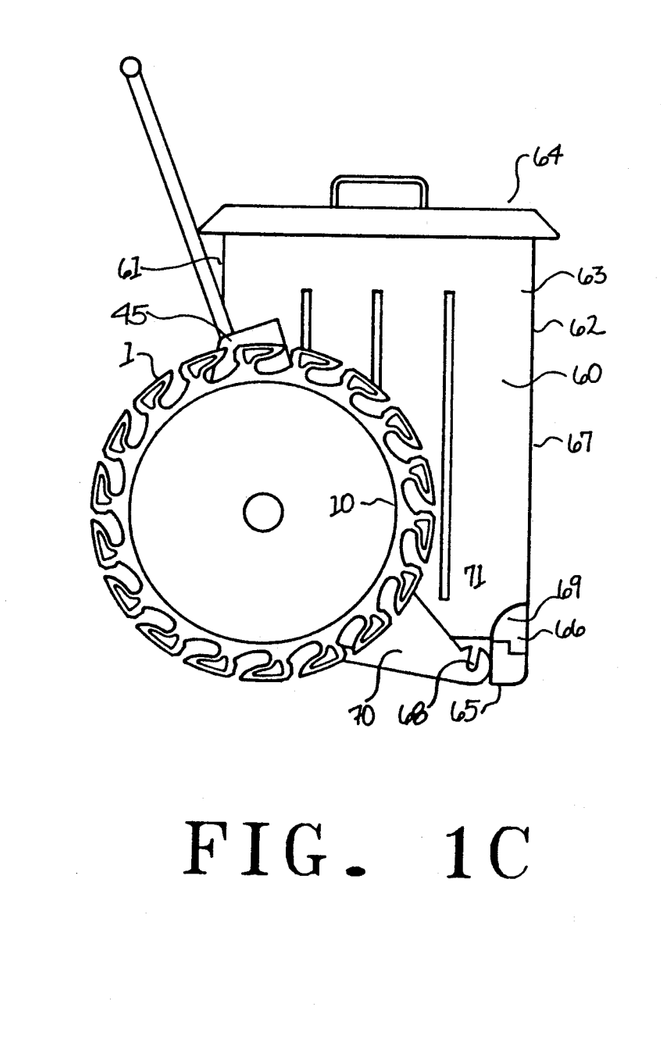
Figure 1D:
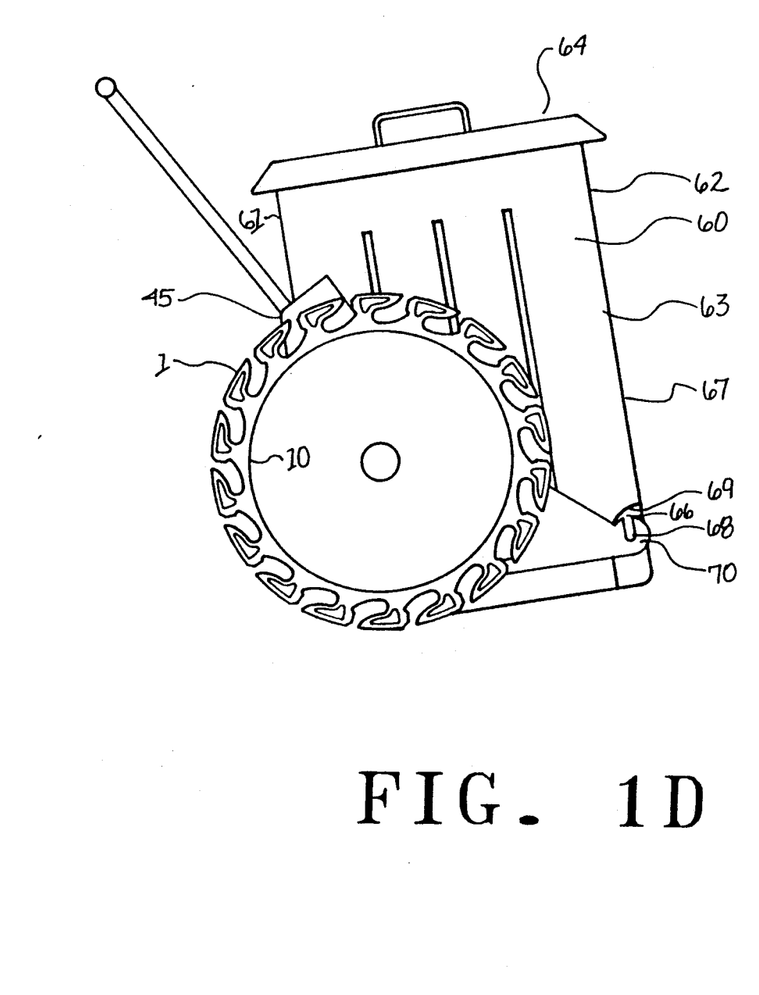

Referring to FIGS. 1A, 1C and 1D there is illustrated a wheel and brake system of the invention having a wheel 10; a tread 1 of the wheel 10; and a brake system 80 to be described in more detail with reference to FIGS. 3A-C, 4A, and 4B. Referring to FIG. 1C, the wheel and brake system of the invention is used in conjunction with a cart structure 45 having a containment vessel 60 for the purpose of holding various items or the like for transportation. Referring to FIG. 1A, the cart structure 45 has two lifting arms 70 each adjacent to one of two wheels 10 and extending out from the cart structure 45 parallel to the ground upon which the wheels 10 rest. Each lifting arm 70 has a notch 68 on the top 71 of the lifting arm 70.

Referring now to FIG. 1B there is illustrated a back view of the containment vessel 60 designed to interconnect with the cart structure 45 (See FIG. 1C). The vessel 60 has a front 61 (See FIG. 1C), two sides 62, a back 63, a top 64, a bottom 65, a lower portion 66 and an upper portion 67. In particular, the sides 62 of the containment vessel 60 at the lower portion 66 are narrower than they are at the upper portion 67 of the vessel 60. At the back 63 of the containment vessel 60, a connector 69 extends from the upper portion 67 at each side, downward and adjacent to the side of the lower portion 66.

Referring now to FIG. 1C, the lifting arms 70 of the cart 45 slide from the front 61 of the containment vessel 60 to the back 63, along each side 62 of the lower portion 66 of each connector 69. When the lifting arm 70 reaches the back 63 of the containment vessel 60, the connector of the vessel 60 fits into the notch 68 of the lifting arm 70. The vessel 60 remains on the ground while the lifting arms 70 of the cart 45 are slid under the vessel 60 and is lifted from the ground.

Referring now to FIG. 1D there is illustrated the cart 45 and containment vessel 60 of FIG. 1C with the cart 45 lifting the containment vessel 60 off the ground.

Figure 2A:
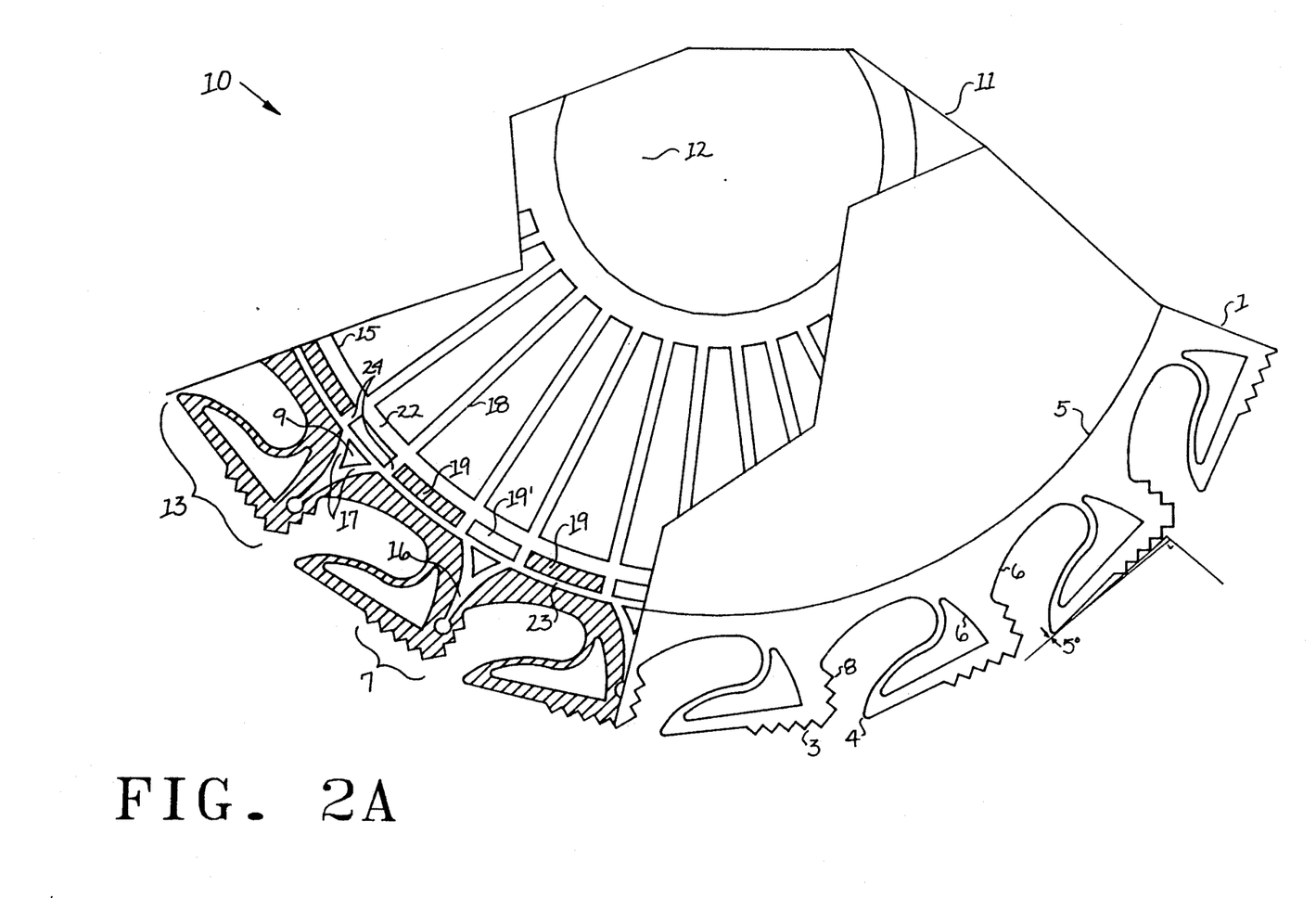
FIG. 2A illustrates a partial outside view and partial cross section of a wheel according to the present invention.
Figure 2B:
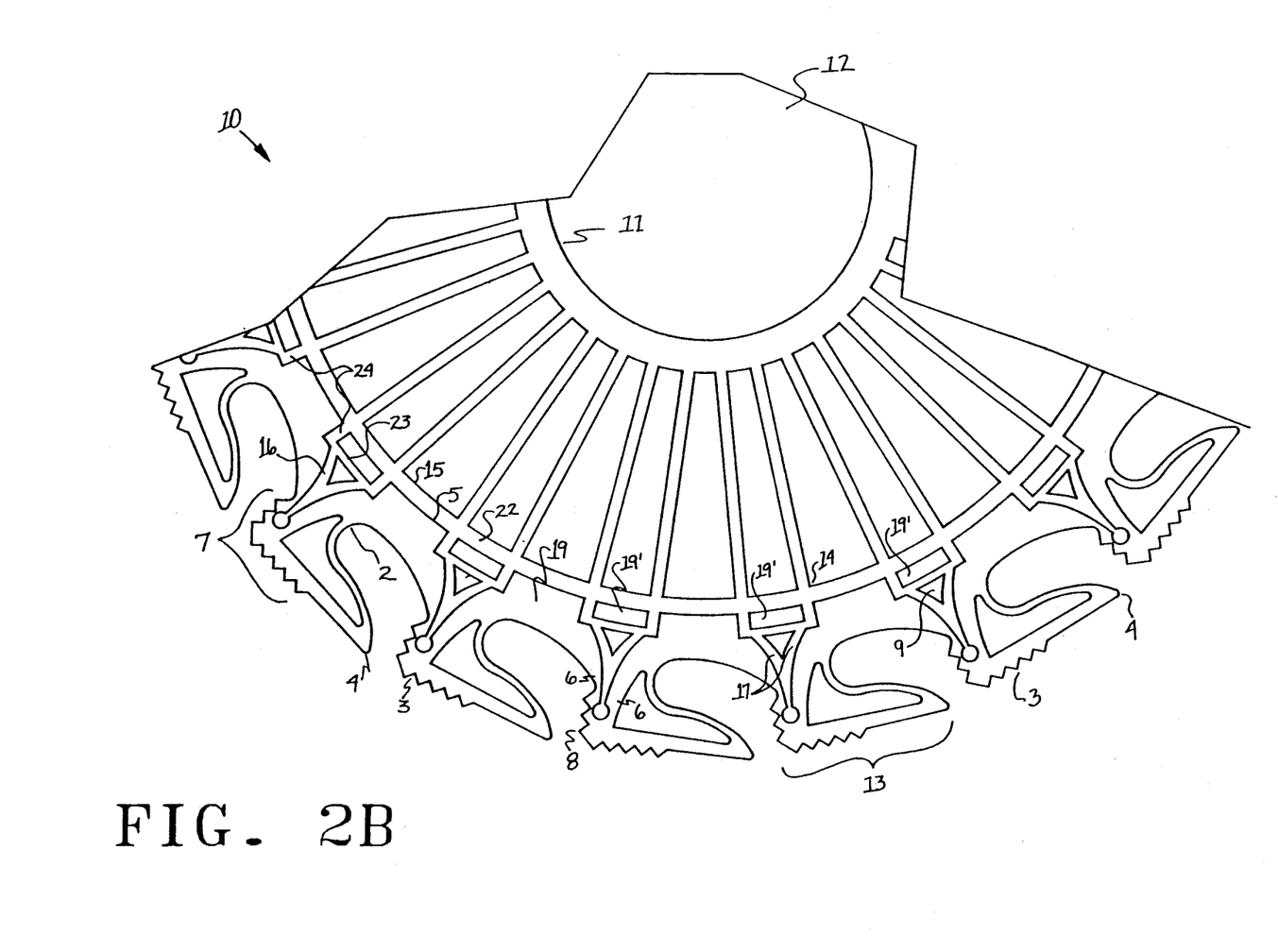
FIG. 2B illustrates a partial inside view of a wheel according to the present invention.
Figure 2C:
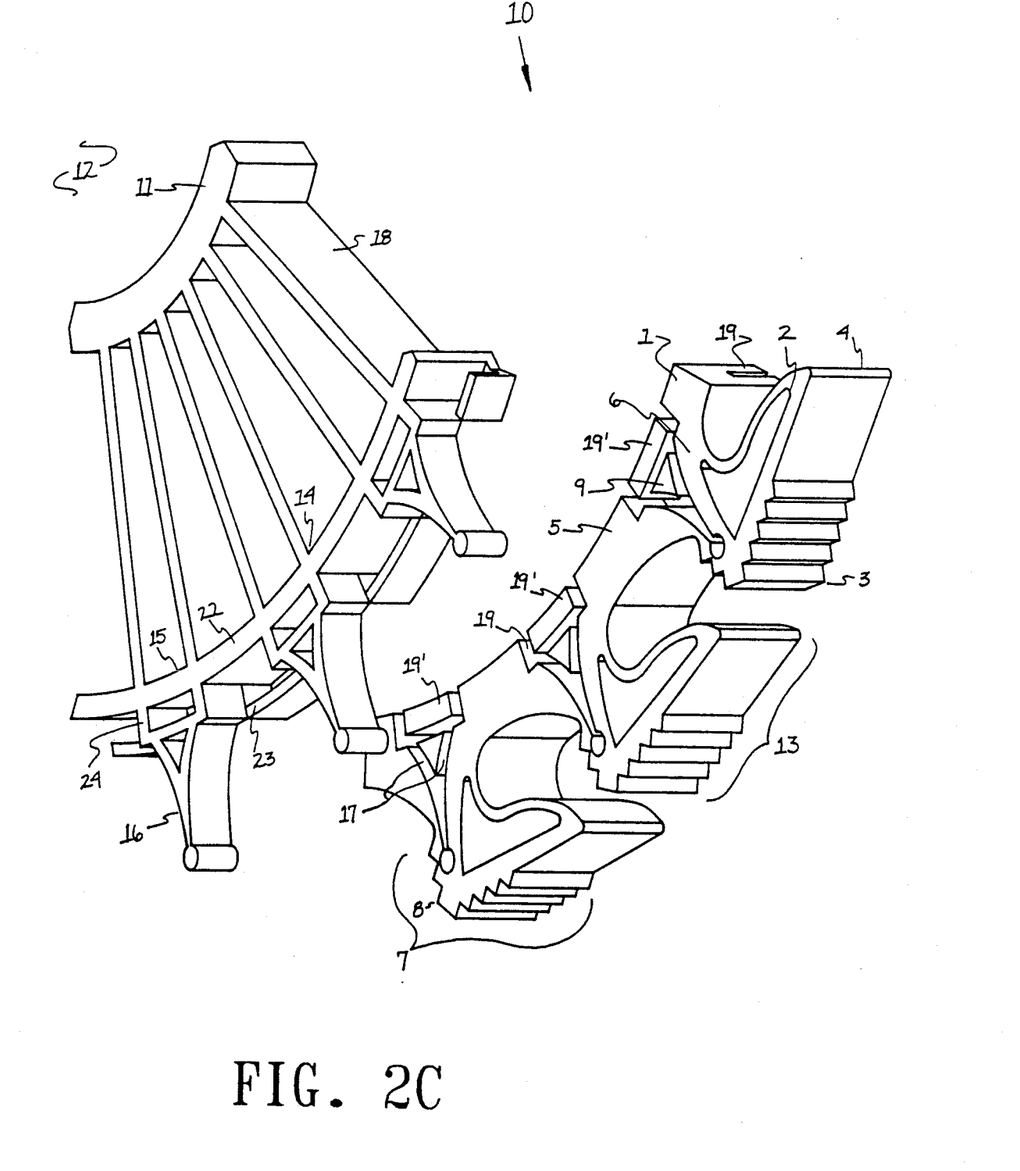
FIG. 2C illustrates an exploded perspective partial inside view of the tread and support structure of FIG. 2B.

Referring to FIG. 2A, 2B and 2C, there is illustrated a wheel 10 comprising a support structure 14 and a tread 1, the tread 1 extending circumferentially around the support structure 14 of the wheel 10. The tread 1 comprises a flexible, resilient material such as rubber or a flexible plastic, e.g., LOMOD (trademark) plastic, while the support structure 14 comprises a strong, firm material such as sheet metal or a rigid plastic, e.g., NARYL (trademark) plastic, to provide structural integrity for the wheel 10.

The tread 1 comprises a rim portion 5 and a plurality of radially projecting elements 2 each projecting radially outward from the rim portion 5 of the tread and spaced circumferentially around the entire outer circumference of the wheel 10. Each element 2 having and outermost surface 13, the outermost surface 13 of each element 2 together defining a substantially continuous outer surface of the wheel 10, i.e., so that the wheel can roll. Each radially projecting element 2 comprises a radial projection 6 which extends outwardly from a hub 15 of a support structure 14 of the wheel 10; a heel portion 3 at the outermost extension of the radial projection 6 and having a back 8 located radially inward from the outermost surface 13; and a flexible resilient toe portion 4 extending circumferentially from the heel portion 3 and spaced radially from the rim portion 5. Each toe portion 4 of each particular radially projecting element 2 is circumferentially spaced from the heel portion 3 of an adjacent radially projecting element 2.

The support structure 14 comprises a hub 15, load bearing elements 16, spokes 18, and an axle portion 11. The hub 15 is joined circumferentially around the wheel 10 by the spokes 18 to the axle portion 11 which is rotatably mounted to an axle 12 of the wheel 10. Each of the load bearing elements 16 extends radially outward from the hub 15 and through each corresponding radial projection 6 of each corresponding radially projecting element 2 to the heel portion 3. Each load bearing element 16 comprises two arms 17 which extend out from the hub 15 and which join at the heel portion 3 of the radially projecting element 2. The thickness of each radial projection 6 of the tread 1 correspondingly increases as it approaches the hub 15. The weight supported by the wheel 10 is transferred from the heel portion 3 which is contacting the ground through the corresponding load bearing element 16 to the hub 15. When a heel portion contacts a surface, the corresponding load bearing element 16 spreads out the weight from the heel portion 3, where arms 17 of the load bearing element 16 are coupled, to the hub 15, where the arms 17 of the load bearing element 16 fan out and are then coupled to the hub 15. As the wheel 10 rotates, the weight transfers from heel portion 3 to toe portion 4 to adjacent heel portion 3.

The tread 1 includes a first set of connective tabs 19 and a second set of connective tabs 19'. The first set of connective tabs 19 and the second set of connective tabs 19' are staggered around an inner circumference of the tread 1. Each of a plurality of protrusions 9 are integral with and nested within one of the radial projections 6, each of the protrusions 9 being shaped so as to fit snugly between the two arms 17 of the corresponding load bearing element 16. The hub 15 of the support structure 14 comprises an inner circumference 22 radially spaced from an outer circumference 23 and slats 24 connecting in the inner circumference 22 and outer circumference 23 and perpendicular to the inner circumference 22 and outer circumference 23 of the hub 15, each slat 24 being circumferentially spaced from an adjacent slat 24. The support structure 14 thus defines one set of openings to receive the first set of connective tabs 19 of the tread from the inside of the support structure 14 and a second set of openings to receive the second set of connective tabs 19' from the outside of the support structure 14. The first set of openings are alternately circumferentially spaced with the second set of openings. The first set of connective tabs 19 and the second set of connective tabs 19' each fit in between the inner circumference 22 and outer circumference 23 of the hub 15, and also in between two adjacent slats 24 which define the first set of openings and the second set of openings. The tread 1, including the radially projecting elements 2 the second set of connective tabs 19' and the protrusions 9, fits into the support structure 14 from an outer surface of the support structure 14. The connective tabs 19 are slid under an outer circumference 23 of the hub 15 and then, approaching the hub 15 from an inner surface of the support structure 14, the connective tabs 19 are slid in between the inner circumference 22 and outer circumference 23 of the hub 15 and between two adjacent slats 24 perpendicular to the inner circumference 22 and outer circumference 23 of the hub 15 as illustrated in FIG. 2B.

The tread 1 and the support structure 14 may be each manufactured as a single unit. The material from which the tread 1 is manufactured is sufficiently flexible and resilient such that the connective tabs 19 may be slid under the hub 15 after which they retain their shape and are fit into the hub 15 as described above.

Figure 3A:
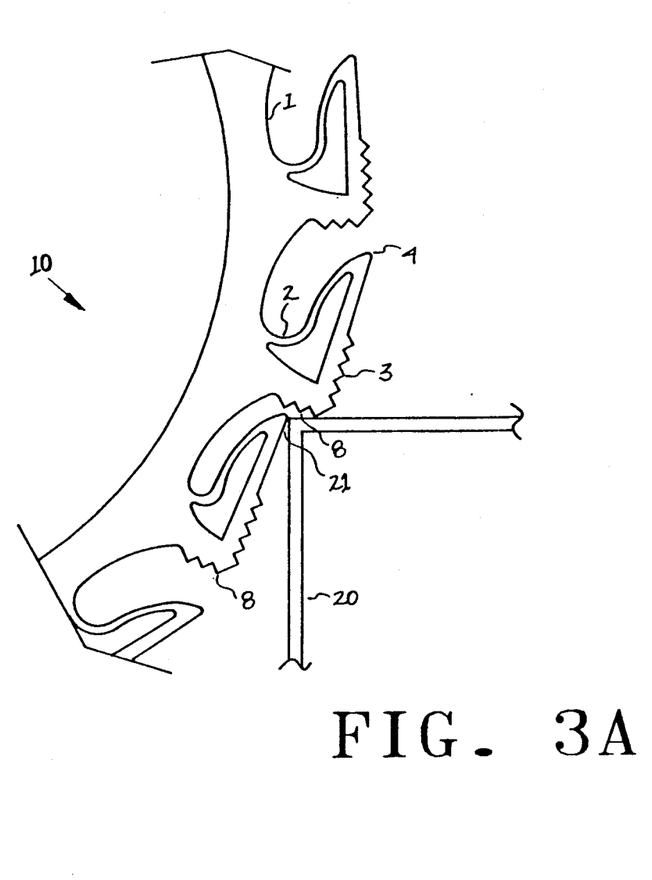
FIGS. 3A, 3B, and 3C illustrate a wheel of the present invention used in conjunction with a stair.
Figure 3B:
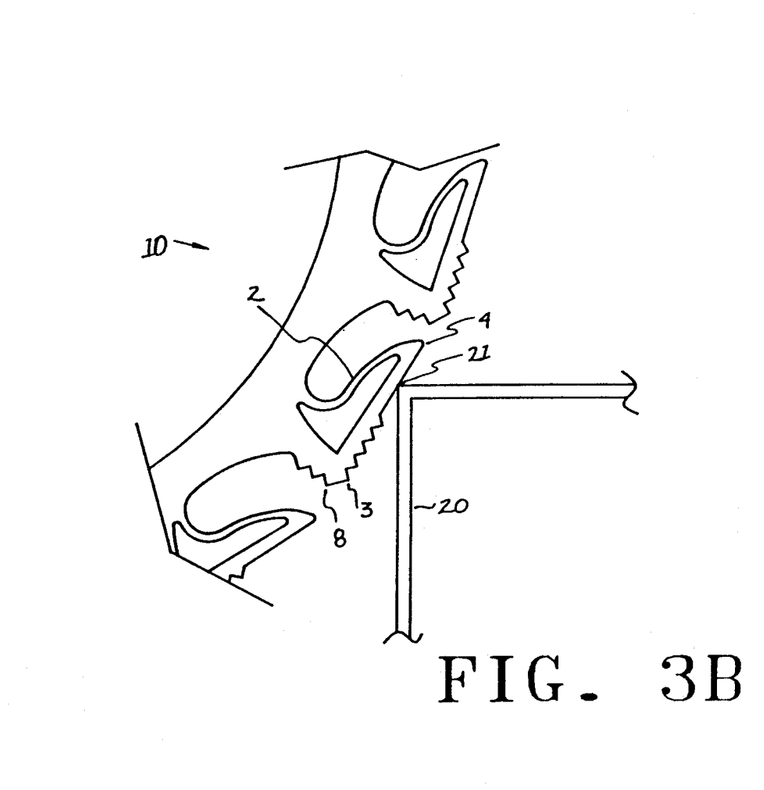
Figure 3C:
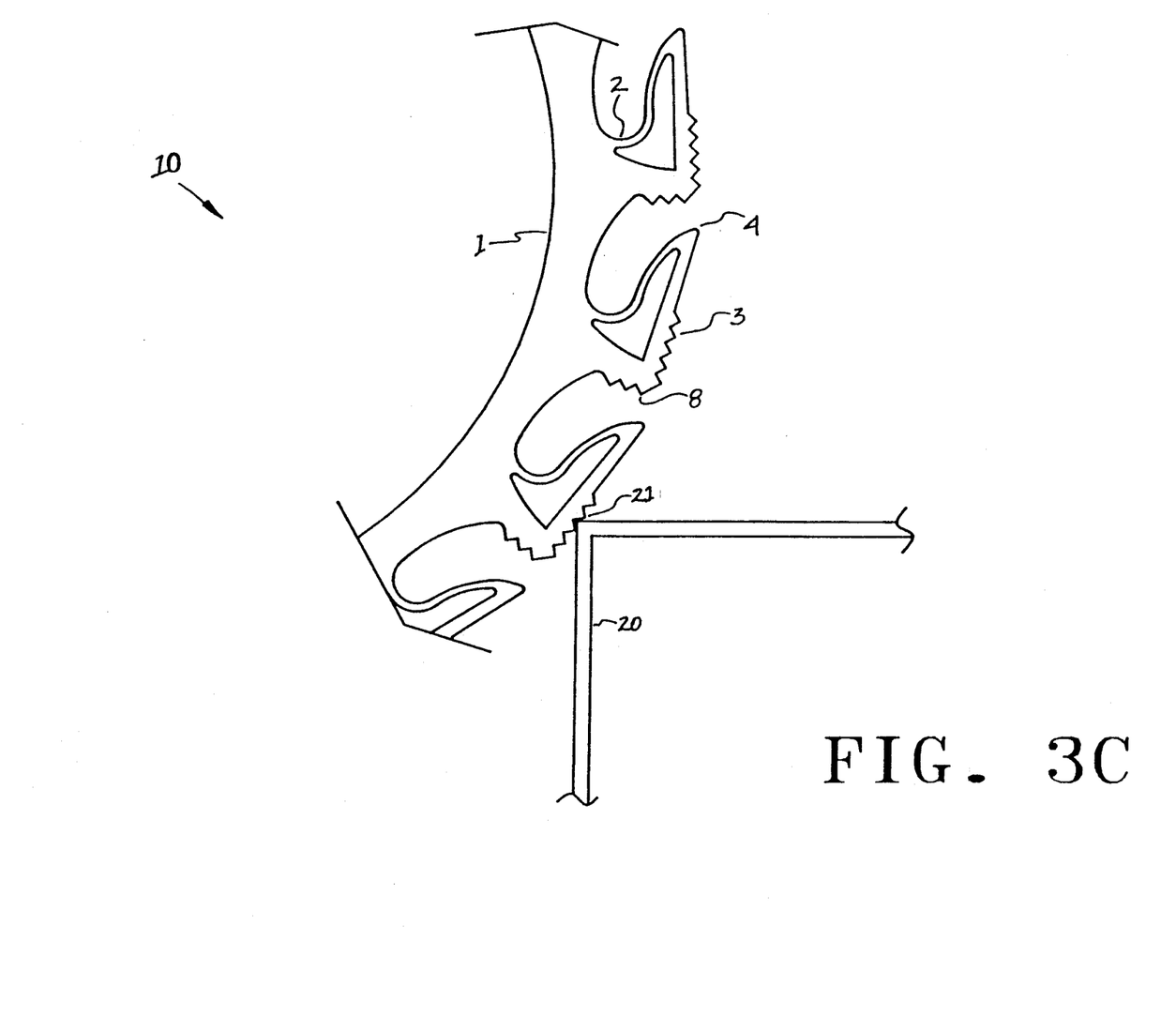

Referring now to FIGS. 3A, 3B and 3C there is illustrated the wheel 10 of FIG. 2 as used in conjunction with a stair 20. In FIG. 3B, the tread 1 of the wheel 10, in particular, the flexible, resilient toe portion 4 of a radially projecting element 2 contacts an outermost edge 21 of a stair 20.

Referring now to FIG. 3A, the flexible resilient material of the radially projecting element 2 allows the toe portion 4 to flex when a force is applied to it and to recover its original shape when the force is released. As the wheel 10 rotates, the outermost edge 21 of the stair 20 causes the flexible, resilient toe portion 4 to flex inward and penetrate the outer circumference of the tread 1, thus exposing the back 8 of the heel portion 3 of an adjacent radially projecting element 2 to the edge 21 of the stair 20. The exposed back 8 of the heel portion 3 acts as a load bearing surface upon which the wheel 10 can rest on the stair 20.

A moment arm is created between the axle portion 11 of the hub 15 and the heel portion 3 of the tread 1 upon which the wheel 10 rests on the stair 20. The interaction between the stair 20 and the heel portion 3 upon which the wheel 10 rests is gear like in nature with the stair 20 and tread 1 meshing as the wheel rotates. The back 8 of the heel portion 3 acts as a load bearing surface to support the wheel 10 on the stair 20 in combination with the ordinary frictional support provided by the surface of the stair 20 to the wheel 10.

If the stair 20 does not contact the radially projecting element 2 at a point which causes the toe portion 4 to deform, e.g., as illustrated in FIG. 3C, if the outermost edge 21 of the stair 20 contacts the heel portion 3 instead, the tread 1 will either slide down such that the force is then applied to the toe portion 4 as illustrated in FIG. 3A, or, a notched surface 7 of the heel portion 3 will grip the stair 20 forming a frictional connection between the tread 1 and the stair 20 while the load bearing element 16 (See FIG. 2A and 2B) provides support for the tread 1.

The toe portion 4 projects cant, for example, approximately 1 to 15 degrees from the radius of the wheel 10 with respect to the heel portion 3. Thus, a more continuous surface between heel portions 3 is created. Thus, the toe portions 4 together provide continuity of the circumference of the wheel 10 between the heel portions 3. When the wheel 10 turns, the weight transfers sequentially from heel portion 3 to heel portion 3, etc., and the toe portions 4 serve to minimize the resulting rattle and/or vibrations.

Figure 4A:
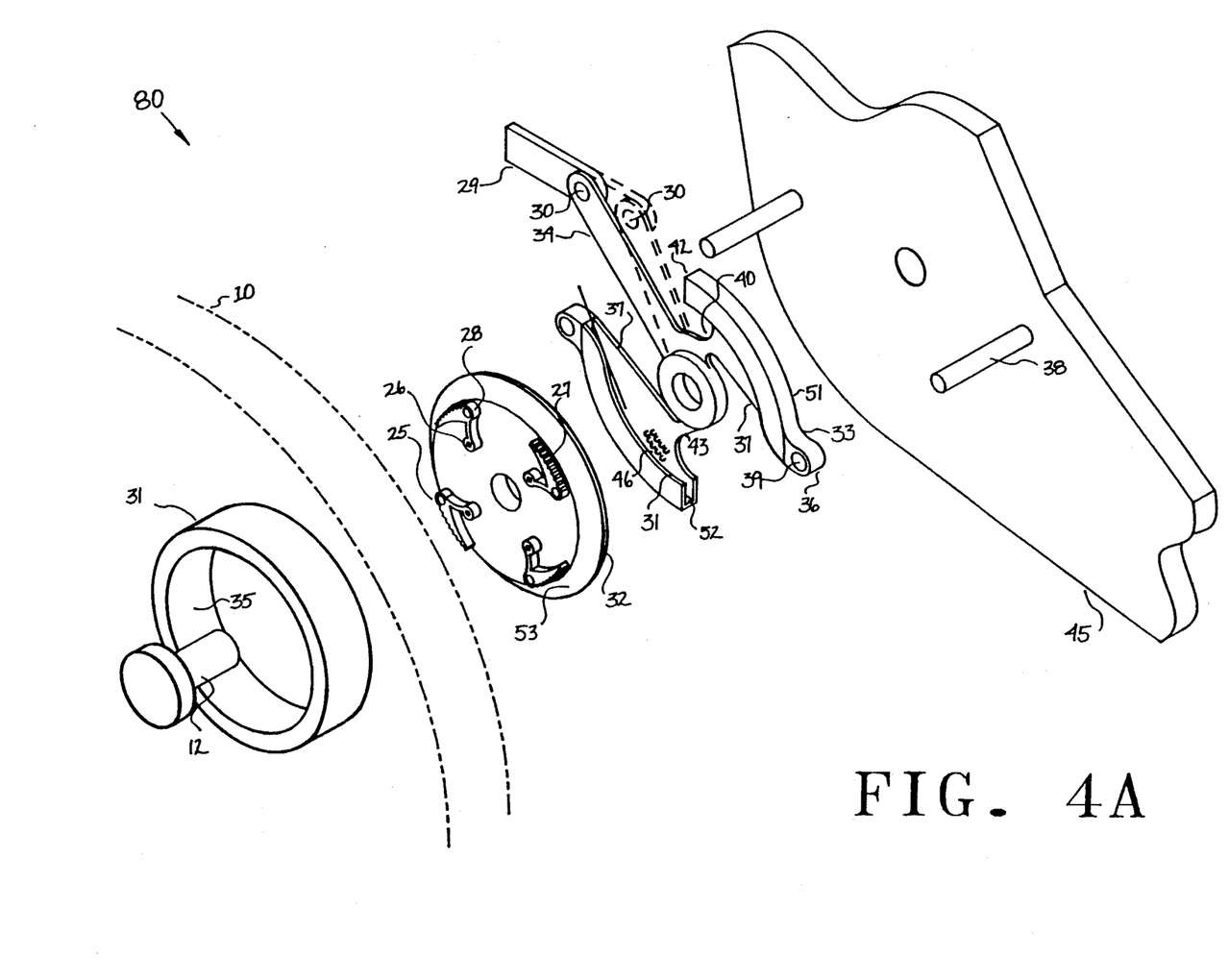
FIG. 4A illustrates an exploded perspective view of the brake system of the present invention.
Figure 4B:
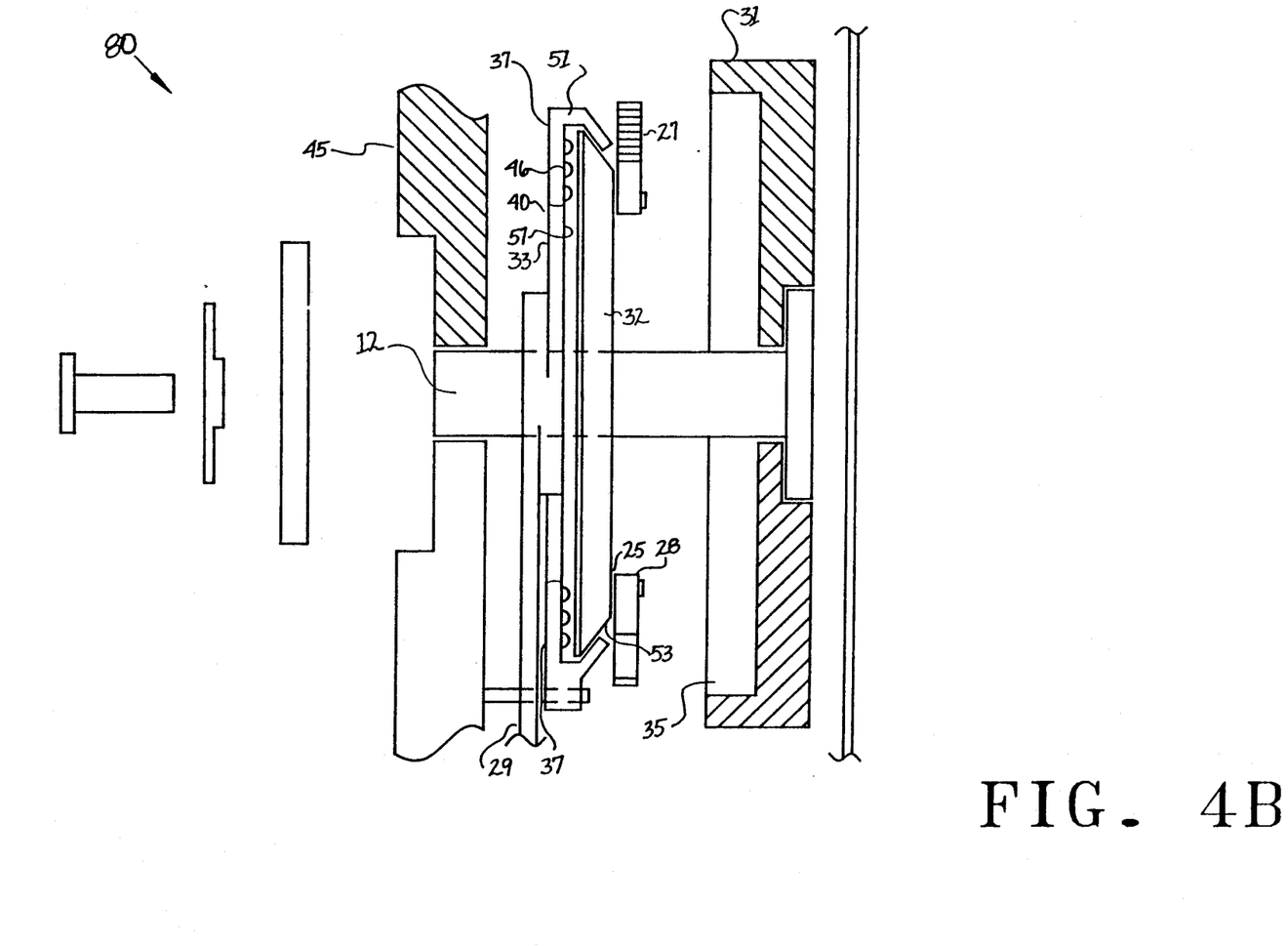
FIG. 4B illustrates a side view partially in cross-section and partially exploded of the brake system of the present invention.

Referring now to FIGS. 4A and 4B, there is illustrated an exploded three dimensional view of a brake system 80 of the wheel 10 and a side view of the brake system 80 respectively. The brake system 80 comprises a brake drum 31, clamping elements 28, a brake disc 32, a butterfly brake 33, and a brake handle 29. The brake drum 31 is set within and is integral with the wheel 10. The brake disc 32 is immediately adjacent and parallel to the brake drum 31 and is rotatably mounted to the axle 12 of the wheel 10.

The clamping elements 28 are located on an outer planar surface 54 of the brake disc 32 and are circumferentially spaced so that they are nested just within and impinge on an inner circumference 35 of the brake drum 31. Each clamping element 28 is connected to the brake disc 32 by way of a post 25 coupled to and perpendicular to the rotational plane of the brake disc 32. Each post 25 allows the corresponding clamping element 28 to rotate around the post 25. Each clamping element 28 has serrations 27 which face radially outward at an angle off perpendicular to the inner circumference 35 of the brake drum 31. A spring element 26 is coupled to each clamping element 28 and is arranged to prevent the corresponding clamping element 28 from rotating freely around its post 25. The spring element 26 maintains each clamping element 28 in a desired set position, i.e., with the serrations 27 impinging on the inner circumference 35 of the brake drum 31. When the brake is engaged, the friction between the inner circumference 35 of the brake drum 31 and the clamping elements 28 slows or prevents rotation of the wheel 10 in a rotational direction against the serrations 27. The wheel 10 is permitted, however, to rotate in a direction with the serrations 27. The spring element 26 of each clamping element 28, permits limited rotation of the corresponding clamping element 28 when the wheel 10 rotates with the serrations 27, the rotation of the wheel 10 causing each clamping element 28 to pivot around the corresponding post 25 at least to a degree necessary to allow rotation of the wheel 10. The brake disc 32 is freely rotatable around the axle 12. However, the clamping elements 28 which impinge on the inner circumference 35 of the brake drum 31 cause a frictional connection between the brake drum 31 and the clamping elements 28 and the brake disc 32 therefore rotates with the wheel 10.

The butterfly brake 33 comprises two tension elements 43 each coupled to corresponding one of two wings 37 of the butterfly brake 33, each wing 37 extending axially out from the tension element 43 and having U-shaped end portion 51. The U-shaped end portion 51 of each wing 37 circumscribes a beveled outer circumference 53 of the brake disc 32, the U-shaped end portion 51 having a beveled inner surface 52 which cooperates with the beveled outer circumference 53 of the brake disc 32.

The outer surface 40 of the butterfly brake 33 interfaces with a cart structure 45.

The butterfly brake 33 is anchored to cart structure 45 by a pin 38 at an anchored tip 36 of each wing 37. The anchored tip 36 is located at or near the point of each wing 37 circumferentially the greatest distance from the point at which each tension element 43 connects with the corresponding wing 37. The axle 12 of the wheel 10 is fixed to the cart structure 45. The brake handle 29 comprises an upper leg 39 connected by a hinge 30 to a lever arm 34. The lever arm 34 is rotatably mounted to the axle 12 of the wheel 10. The lever arm 34 is connected at or near the axle 12 to each of the tension elements 43 of the butterfly brake 33.

The butterfly brake 33 is controlled by user manipulation of the brake handle 29. When the brake handle 29 is pulled towards a user, the upper leg 39 exerts a force on the lever arm 34 causing the lever arm 34, hinge 30, and upper leg 39 to act as a lever. Thus, the pulling force exerted by the use is transferred from the upper leg 39 into a moment force exerted on by the lever 34 which correspondingly exerts a force on the tension elements 4 of the butterfly brake 33.

When the handle 29 is pulled and a force exerted on the tension elements 43, the tension elements 43 correspondingly exert a force on the wings 37. The anchored tips 36 of the wings 37 prevent the butterfly brake 33 from rotating around the axle 12, thus, the force on each wing 37 causing the wing 37 to pivot around its corresponding anchored tip 36. An unanchored end 42 of each of the wings 37 contracts inwardly toward the axle 12, causing U-shaped end portion 51 of each wing 37 to displace inwardly and cause a frictional contact between the beveled inner surface 52 of the wing 37 and the cooperating beveled out circumference 53 of the brake disc 32. The frictional contact impedes rotation of the brake disc 32, thus engaging the brake. When the brake disc 32 ceases to rotate, the clamping elements 28 correspondingly prevent the brake drum 31, i.e., the wheel 10 from rotating in the direction which causes the cart 45 to roll away from the user.

Simultaneously, because of the configuration of the clamping elements 28 as described above, the disc 32 permits rotation of the wheel in a direction which permits the cart to be pulled towards the user. Thus, the user may pull the device while the brake is self-actuated, preventing the device from rolling away from the user.

The tension elements 43 are designed to be flexible yet have sufficient tensile strength so that when a force is applied to the tension elements 43, the tension elements 43 cause the wings 37 to displace. When the force has been released, the tension elements 43 substantially recover their original form.

A plurality of nodes 46 are set on an inner face 57 of the U-shaped end portion 51 of each wing 37 directly across from the beveled outer circumference 53 of the brake disc 32. While disengaged, the beveled outer circumference 53 of the brake disc 32 and the beveled inner surface 52 of the wing 37 are spaced substantially parallel with respect to each other.

When the brake is engaged, in addition to the frictional contact between the beveled inner surface 52 of the wing 37 and the outer beveled circumference 53 of the brake disc 32, the wing 37 deforms into the outer surface 54 of the brake disc 32 causing a frictional contact between the nodes 46 and the outer surface of the brake disc 32 thereby impeding rotation of the brake disc 32.

The brake is disengaged when the user pushes the cart 45 thus releasing the force on the brake handle 29 and the lever arm 34 which causes the wings 37 butterfly brake 33 to displace and engage.

We claim:

1. A tread of a wheel comprising:
    a plurality of elements circumferentially spaced around the wheel, each of said elements having an outermost surface, the outermost surfaces of the elements define a substantially circular outer edge of the tread;
    each element having a load bearing surface, locating radially inwardly from the outermost surface of said element;
    each of said elements comprising a flexible resilient portion adapted to flex inwardly relative to said circular outer edge upon contact with a protruding surface to expose the load bearing surface of an adjacent element so that the load bearing surface may support at least a portion of a load borne by the wheel upon flexure of the flexible resilient portion of said element.

2. The tread of claim 1 wherein each of said elements comprises:
    a heel portion; and
    wherein said flexible resilient portion comprises a toe portion, said toe portion extending circumferentially from the corresponding heel portion and spaced radially form a rim portion of the tread, said toe portion being spaced from an adjacent heel portion; and,
    Wherein said respective one of said load bearing surfaces comprises the back of the adjacent heel portion.

3. The tread of claim 2 wherein at least one of said toe portions project cant from the radius of the wheel with respect to said heel portion.

4. A wheel comprising:
    a tread having:
        a plurality of elements circumferentially spaced around the wheel, each of said elements having an outermost surface, the outermost surface of the elements define a substantially circular outer edge of the tread;
        each element having a load bearing surface, located radially inwardly from the outermost surface of said element;
        each of said elements comprising a flexible resilient portion adapted to flex inwardly relative to said circular outer edge upon contact with a protruding surface to expose the load bearing surface of an adjacent element so that the load baring surface may support at least a portion of a load borne by the wheel upon flexure of the flexible resilient portion of said element;
    said tread including a first set of connective tabs and a second set of connective tabs; and
    a support structure, said support structure defining one set of openings to receive said first set of connective tabs of the tread from one side of the support structure and a second set of openings to receive said second set of connective tabs of the tread from another side of the support structure.

5. A brake system comprising:
    a vehicle;
    a rotatable wheel mounted to said vehicle for transportation of said vehicle;
    a brake; and
    a handle connected to said vehicle and to said brake;
    said handle adapted for moving said vehicle in a pulling direction and gradually engaging said brake when a pulling force is applied in the pulling direction, said brake fully engaging when a sufficient amount of pulling force is applied, said brake, when engaged, adapted to permit rotation of said wheel in the pulling direction and to impede rotation of said wheel in an opposite direction, said handle adapted for disengaging said brake when a pushing force is applied to permit free rotation of said wheel.

6. The brake system of claim 5 wherein said brake comprises:
    a brake drum having an inner circumference set within said wheel;
    a brake disc capable of interacting with said brake drum to impede rotation of said wheel upon engaging of said brake drum; and
    a brake actuating element coupled to said handle which upon applying a pulling force to said handle, said brake actuating element contacts said brake disc to impede rotation of said brake disc.

7. The brake system of claim 6 wherein said wheel comprises a tread having:
    a plurality of elements circumferentially spaced around the wheel, each of said elements having an outermost surface, the outermost surfaces of the elements define a substantially circular outer edge of the tread;
    each element having a load bearing surface, locating radially inwardly from the outermost surface of said element;
    each of said elements comprising a flexible resilient portion adapted to flex inwardly relative to said circular outer edge upon contact with a protruding surface to expose the load bearing surface of an adjacent element so that the load bearing surface may support at least a portion of a load borne by the wheel upon flexure of the flexible resilient portion of said element.

8. A brake system for braking a wheel comprising:
    a first braking element adapted to be affixed to a wheel, the wheel being freely rotatable on an axle;
    a second braking element freely rotatably mounted on the axle adjacent to said first braking element and being in frictional contact with said first braking element;
    a brake actuating element to impede rotation thereof, so that when the brake actuating device impedes rotation of the second braking element, the frictional contact between the first braking element and the second braking element impedes rotation of the wheel.

9. The brake system of claim 8 wherein said first braking element comprises an inner circumferential surface; and
    said second braking element comprises serrations arranged on an outer surface of said second braking element to interact with the inner circumferential surface to achieve the frictional contact between said first braking element and said second braking element and thereby impede rotation of the wheel in a direction against said serrations and permit rotation of the wheel in the direction of said serrations.

10. The brake system of claim 9 wherein said second braking element is a brake disc and wherein said brake actuating element comprises a plurality of wings each having an inner surface which cooperates with an outer circumference of said brake disc, said wings capable of being displaced circumferentially inwardly when engaged, to impede rotation of said brake disc.

11. The brake system of claim 8 further comprising a handle coupled to said brake actuating element wherein said handle is adapted to gradually engage said brake actuating element to a degree corresponding to an amount of a pulling force applied to said handle and to completely engage said brake when a sufficient amount of pulling force is applied to said handle.

12. The brake system of claim 8
wherein said brake actuating element has an inner surface which cooperates with an outer circumference of said second braking element, impeding rotation of said second braking element when said brake actuating element is engaged.

13. The brake system of claim 8 wherein said second braking element is a brake disc and wherein said brake actuating element comprises a plurality of wings each having an inner surface which cooperates with an outer circumference of said brake disc, said wings capable of being displaced circumferentially inwardly when engaged, to impede rotation of said brake disc.

14. A wheel and brake system comprising:
a plurality of elements circumferentially spaced around the wheel, each of said elements having an outermost surface, the outermost surfaces of the elements define a substantially circular outer edge of the tread;
each element having a load bearing surface, located radially inwardly from the outermost surface of said element;
each of said element comprising a flexible resilient portion adapted to flex inwardly relative to said circular outer edge upon contact with a protruding surface to expose the load bearing surface of an adjacent element so that the load bearing surface may support at least a portion of a load borne by the wheel upon flexure of the flexible resilient portion of said element;
a vehicle;
a rotatable wheel mounted to said vehicle for transportation of said vehicle;
a brake;
a handle connected to said vehicle and to said brake;
said handle adapted for moving said vehicle in a pulling direction and gradually engaging said brake when a pulling force is applied in the pulling direction, said brake fully engaging when a sufficient amount of pulling force is applied, said brake, when engaged, adapted to permit rotation of said wheel in the pulling direction and to impede rotation of said wheel in an opposite direction, said handle adapted for disengaging said brake when a pushing force is applied to permit free rotation of said wheel.

15. The wheel and brake system of claim 14 wherein said vehicle comprises two arms and a vessel constructed for reception of said two arms, said two arms capable of acting to lift said vessel from a surface.

16. The wheel and brake system of claim 14 wherein said vehicle comprises a cart, said cart being capable of being folded.

* * * * *